(12) United States Patent
Chiang

(10) Patent No.: US 7,597,513 B2
(45) Date of Patent: Oct. 6, 2009

(54) UPRIGHT INCLINED-HOLE DRILLING JIG

(76) Inventor: Vance Chiang, 5F.-2, No. 212, Sec. 1, Wunsin Rd., Taichung City (408) (TW)

( * ) Notice: Subject to any disclaimer, the term of this patent is extended or adjusted under 35 U.S.C. 154(b) by 284 days.

(21) Appl. No.: 11/724,779

(22) Filed: Mar. 16, 2007

(65) Prior Publication Data

US 2008/0226406 A1    Sep. 18, 2008

(51) Int. Cl.
*B23B 47/28*    (2006.01)
(52) U.S. Cl. .................. 408/115 R; 408/97; 408/103; 408/241 G
(58) Field of Classification Search .................. 408/97, 408/103, 115 R, 241 B, 241 G; B23B 47/28
See application file for complete search history.

(56) References Cited

U.S. PATENT DOCUMENTS

| | | | | |
|---|---|---|---|---|
| 4,082,474 A | * | 4/1978 | Stiger | 408/110 |
| 4,242,016 A | * | 12/1980 | Faris | 408/14 |
| 4,391,558 A | * | 7/1983 | Perry | 408/110 |
| 4,865,496 A | * | 9/1989 | Challis | 408/115 R |
| 4,955,766 A | * | 9/1990 | Sommerfeld | 408/87 |
| 5,791,835 A | * | 8/1998 | Chiang et al. | 408/115 R |
| 5,797,708 A | * | 8/1998 | Bencic | 408/112 |
| 6,481,937 B1 | * | 11/2002 | Sommerfeld et al. | 408/115 R |
| 6,637,988 B1 | * | 10/2003 | Park | 408/103 |
| 6,726,411 B2 | * | 4/2004 | Sommerfeld et al. | 408/1 R |
| 2005/0089381 A1 | * | 4/2005 | Liu et al. | 408/115 R |
| 2006/0228180 A1 | * | 10/2006 | Sommerfeld et al. | 408/115 R |
| 2007/0280795 A1 | * | 12/2007 | McDaniel et al. | 408/115 R |
| 2008/0075546 A1 | * | 3/2008 | Lin | 408/115 R |
| 2008/0099101 A1 | * | 5/2008 | Chiang | 144/2.1 |

* cited by examiner

*Primary Examiner*—Eric A Gates

(57) ABSTRACT

An improved upright drilling jig comprises two parallel panels parallelly mounted on a leveled base platform, and an inclined-hole drilling jig slidably disposed between the sides of the parallel panels in a manner that it can be vertically adjusted. A sliding saddle is slidably mounted at the top of the inclined-hole drilling jig through two axial bars. The rear side of the drilling jig is concavely constricted to form a bow jumper area and disposed with a discharge concavity in a manner approaching a clamping end plane. The discharge concavity has a chip hole inside that communicates with a guide axle hole. Such arrangement can achieve optimum performance of inclined hole drilling of woodwork.

5 Claims, 7 Drawing Sheets

UPRIGHT INCLINED-HOLE DRILLING JIG

BACKGROUND OF THE INVENTION

1. Field of the Invention

The present invention relates to a DIY woodwork drilling, more particularly, an improved upright inclined-hole drilling jig structure.

2. Description of the Related Art

Inclined-hole drilling of woodwork is primarily used in the corner joint of woodpieces. Conventional techniques commonly use step drill bit having different diameters to drill stepped holes to prevent excess depth of the holes for jointing two woodpieces from affecting the structural integrity of the wood and causing cracks and damages. Step drill bits need to angle obliquely to create a specific inclined hole for bolting and fixation. Drilling of specific inclined holes typically employs an upright inclined-hole drilling jig as shown in FIG. 7. Such drilling jig comprises mainly a horizontal base platform 1 as foundation, and a securely mounted inclined-hole drilling jig 2 and a clamping fixture 3 disposed at two opposing sides of the base platform 1. The vertical clamping plane 2a of inclined-hole jig 2 provides vertical support for the workpiece 4, which is pushed against by the axially-stretching pressing end 3a of the claming fixture 3 and held in place. When drilling, a guide axle hole 2b and a guide sleeve obliquely disposed over the top of inclined-hole drilling jig 2 would guide the drill bit 6 to drill downward. The operation requires precision line drawing and grooving on the workpiece. Although the guide sleeve 5 provides some guidance, the actual drilling still relies on the experience of the operator with electrical drill. The whole operation is not only troublesome and time consuming, it tends to damage the drill bit. Moreover, the inclined-hole drilling jig 2 offers only one height, which hardly meets the varying requirements for inclined holes nowadays. Also as guide sleeve 5 and guide axle hole 2b are disposed in closed space, which makes the ready removal of wood chips produced in the drilling process difficult and tends to result in inclined holes that are not up to the desired quality.

SUMMARY OF THE INVENTION

The primary object of the present invention is to provide an improved upright inclined-hole drilling jig, which can rapidly adjust the positioning of holes to be drilled and guide the drilling operation, thereby achieving the best effect for drilling of woodwork.

Another object of the present invention is to provide an improved upright inclined-hole drilling jig, which can be connected to an external power-driven system to offer stable and precision guide for inclined-hole drilling.

The drilling jig according to the invention is characterized in which it facilitates the drilling of inclined holes on workpieces of varying thickness through vertical displacement of the two sides of the inclined-hole drilling jig relative to the parallel panels. It furthers uses a sliding saddle mounted at the top of the inclined-hole drilling jig and two axial rods perpendicular to an inclined plane at the top of the jig to provide steady guide to make sure drilling of inclined holes is precise without shift. More particularly, the concave constricted design at the bow jumper area at the rear of the inclined-hole drilling jig gives the operator the best field of vision. The discharge concavity designed in a manner approaching the clamping plane is transversely extended in broad-top hole shape to make sure that wood chips are smoothly removed under the spiral traction of drill bit through the internally communicated chip hole. The design of a plurality of parallel grooves on the retainer shoulder at two sides of the inclined-hole drilling jig reduces the side-to-side friction to facilitate the vertical sliding adjustment of the drilling jig. In such a manner, the drilling jig can be rapidly adjusted and positioned, and provide precision guide according to the thickness of the workpiece to be drilled, thereby achieving optimum performance.

The objects, features and functions of the present invention are illustrated in detail below with a preferred embodiment and accompanying drawings.

DETAILED DESCRIPTION OF THE PREFERRED EMBODIMENT

Figure 1:
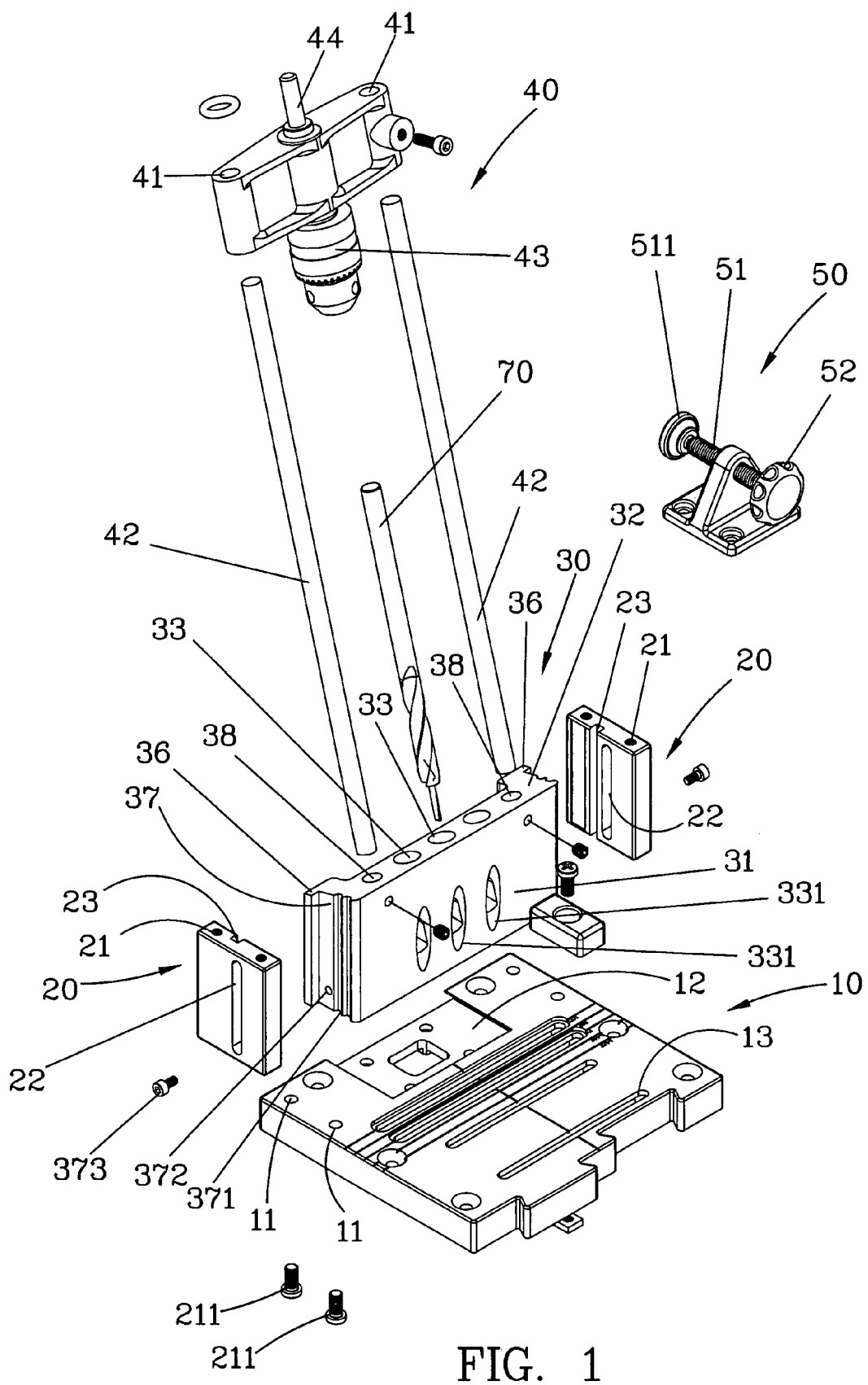
FIG. 1 is a partial exploded view of a preferred embodiment of the invention.
Figure 2:
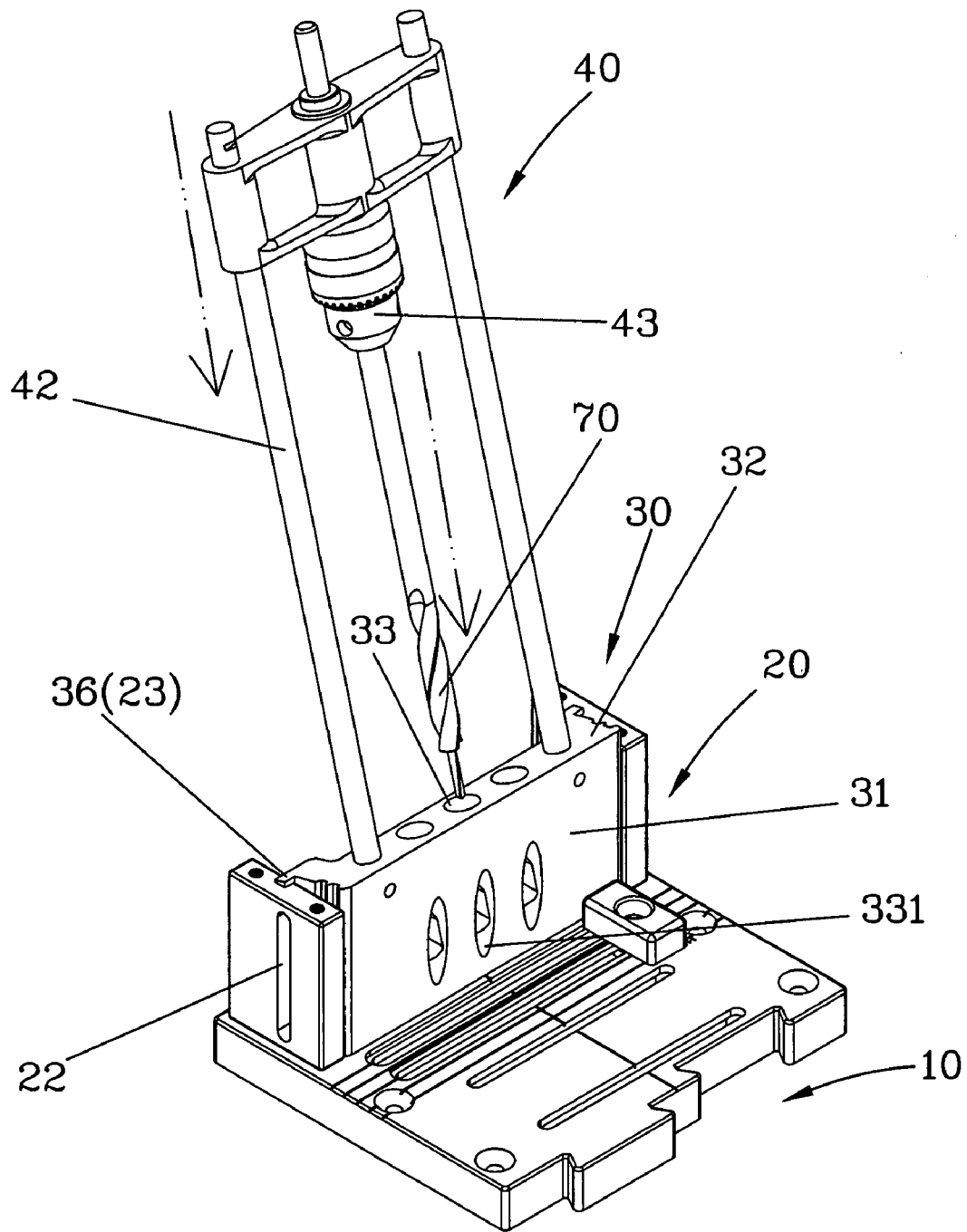
FIG. 2 is a partial assembled view of the invention viewed from the front.
Figure 3:
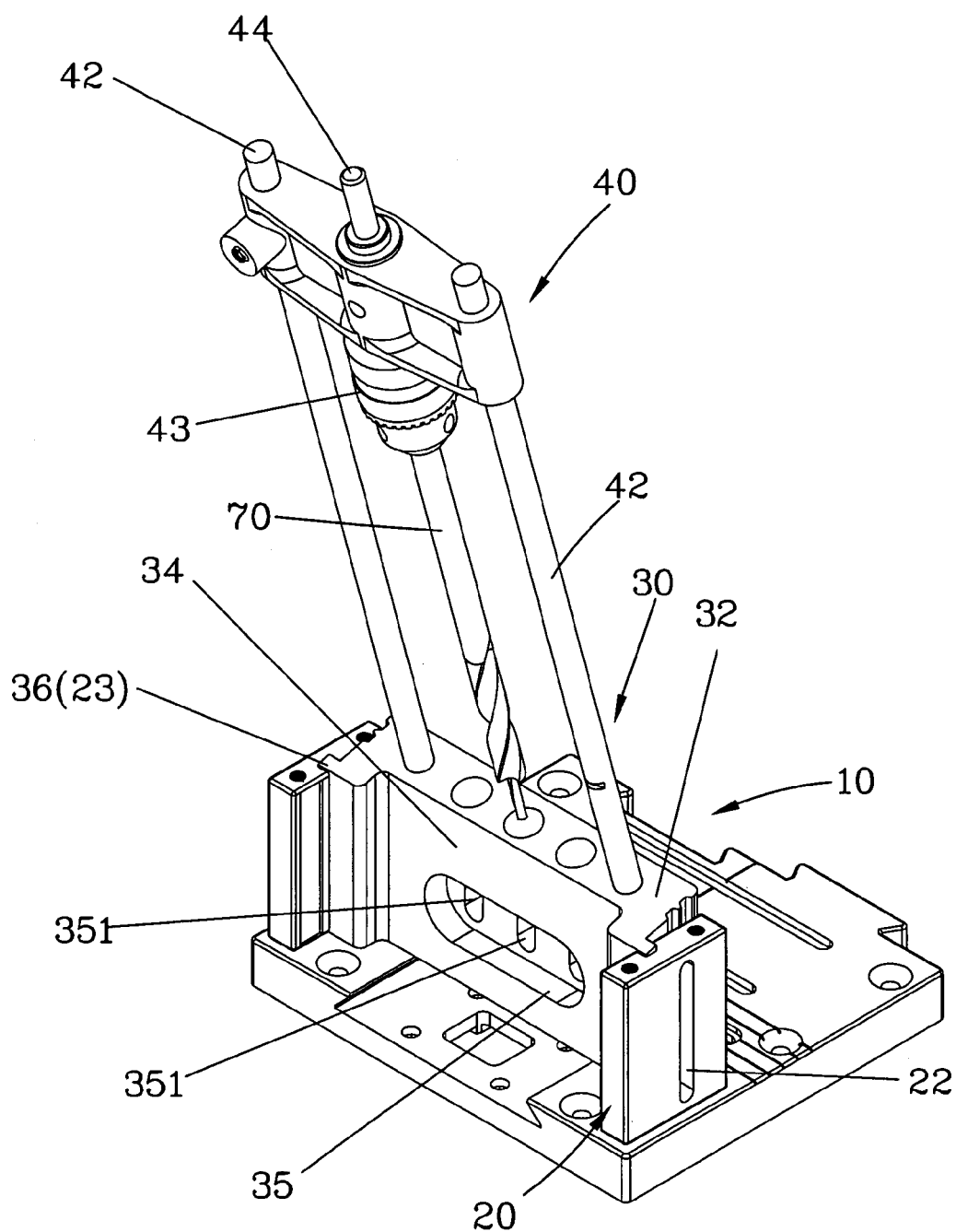
FIG. 3 is partial assembled view of the invention viewed from the back.

Referring to FIGS. 1~6, the improved upright drilling jig of the invention comprises a base platform 10, two parallel panels 20, a drilling jig 30, a sliding saddle 40, and a holder 50.

The base platform 10 is a horizontal extending board disposed with a set of positioning holes 11 configured on the right and left sides at its axial front end, a receiving concavity 12 at the center of its axial front end, and a plurality of parallel positioning slots 13 at its axial rear end to position and secure other elements such as the holder 50.

The parallel panel 20 is a rectangular plate concavely disposed with two bolt holes that run through from its top to bottom to allow mounting bolts 211 to screw into the axial front end positioning holes configured on the right and left sides of base platform 10. On the side of the parallel panel 20 opposing to the other parallel panel 20 is each disposed with a perforated limiting slot hole 22. On the plane adjacent to the limiting slot hole 22 is concavely disposed with a longitudinal sliding slot 23.

The drilling jig 30 is slidably disposed between the two parallel panels 20 in a manner that allows vertical adjustment, and provided with a clamping end plane 31 at its front that is perpendicular to the base platform 10 to provide vertical support for a workpiece 60. The drilling jig 30 is further provided with an inclined plane 32 having a predefined angle at its top side, which is concavely disposed with three spaced guide axle holes 33 thereon. The guide axle hole 33 is tilting downward and perforates the clamping end plane 31 to form an outlet 331 so as to provide guide for a drill bit 70. The rear side of the drilling jig 30 is concavely constricted to form a bow jumper area 34 and disposed with a discharge concavity 35 in a manner approaching the clamping end plane 31, the discharge concavity 35 being preferably a transverse hole and having a chip hole 351 inside that communicates with the guide axle hole 33. The ends of the bow jumper area 34 on the right and left side are extended to form a vertical slide track 36 that engages the longitudinal sliding slot 23 and form a retainer shoulder 37 that adjoins the side surface of the parallel panel 20. The retainer shoulder 37 is concavely disposed with a plurality of parallel grooves 371 spaced apart and a bolt hole 372 at its bottom relative to the limiting slot hole 21 of the parallel panel 20, which allows a mounting bolt 373 to pass through and be stopped by the limiting slot hole 21. There is also provided a set of fixating holes 38 on the right and left side of the top-side inclined plane 32.

Figure 4:
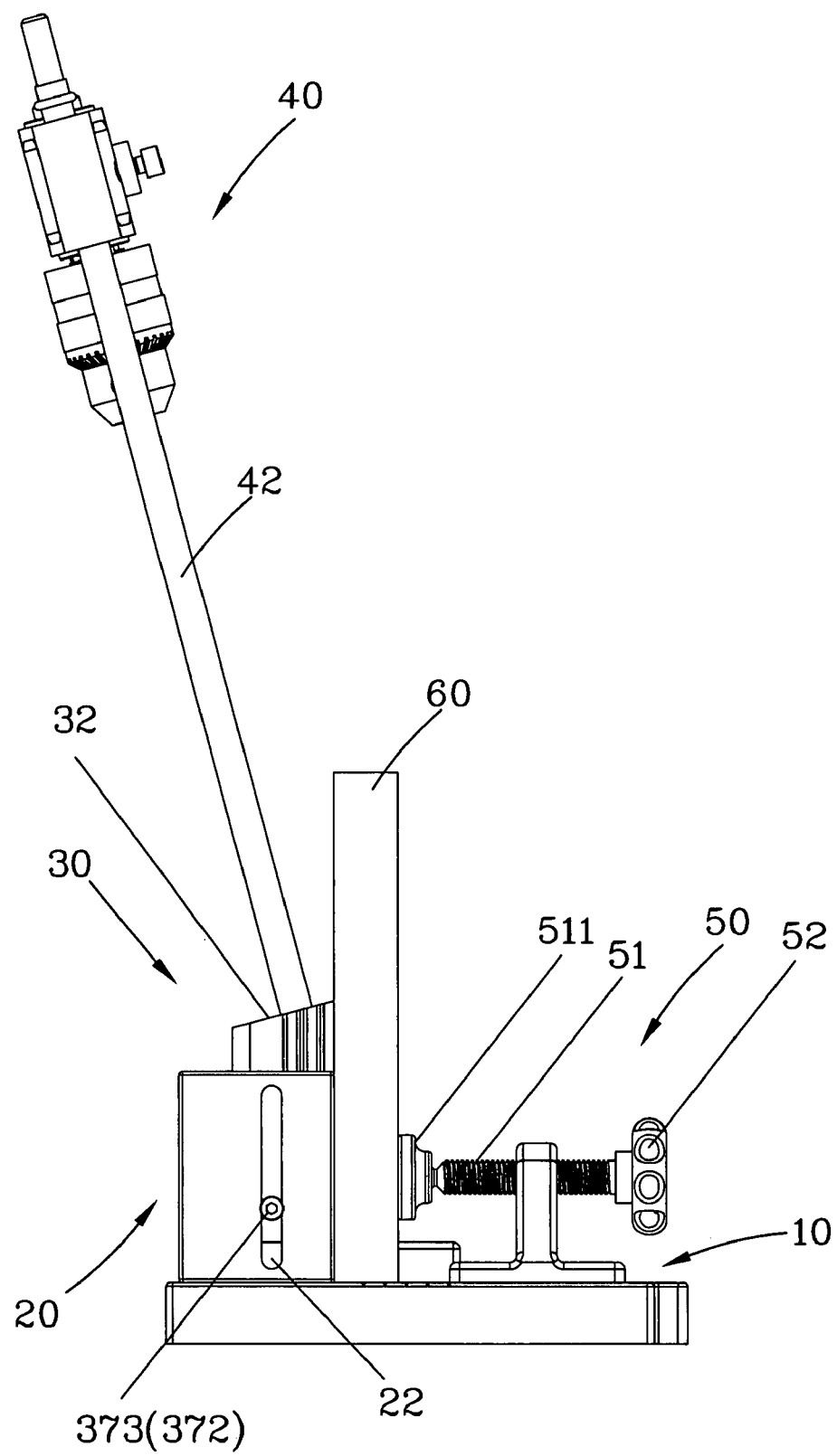
FIG. 4 is a side view of a preferred embodiment of the invention in assembly.
Figure 5:
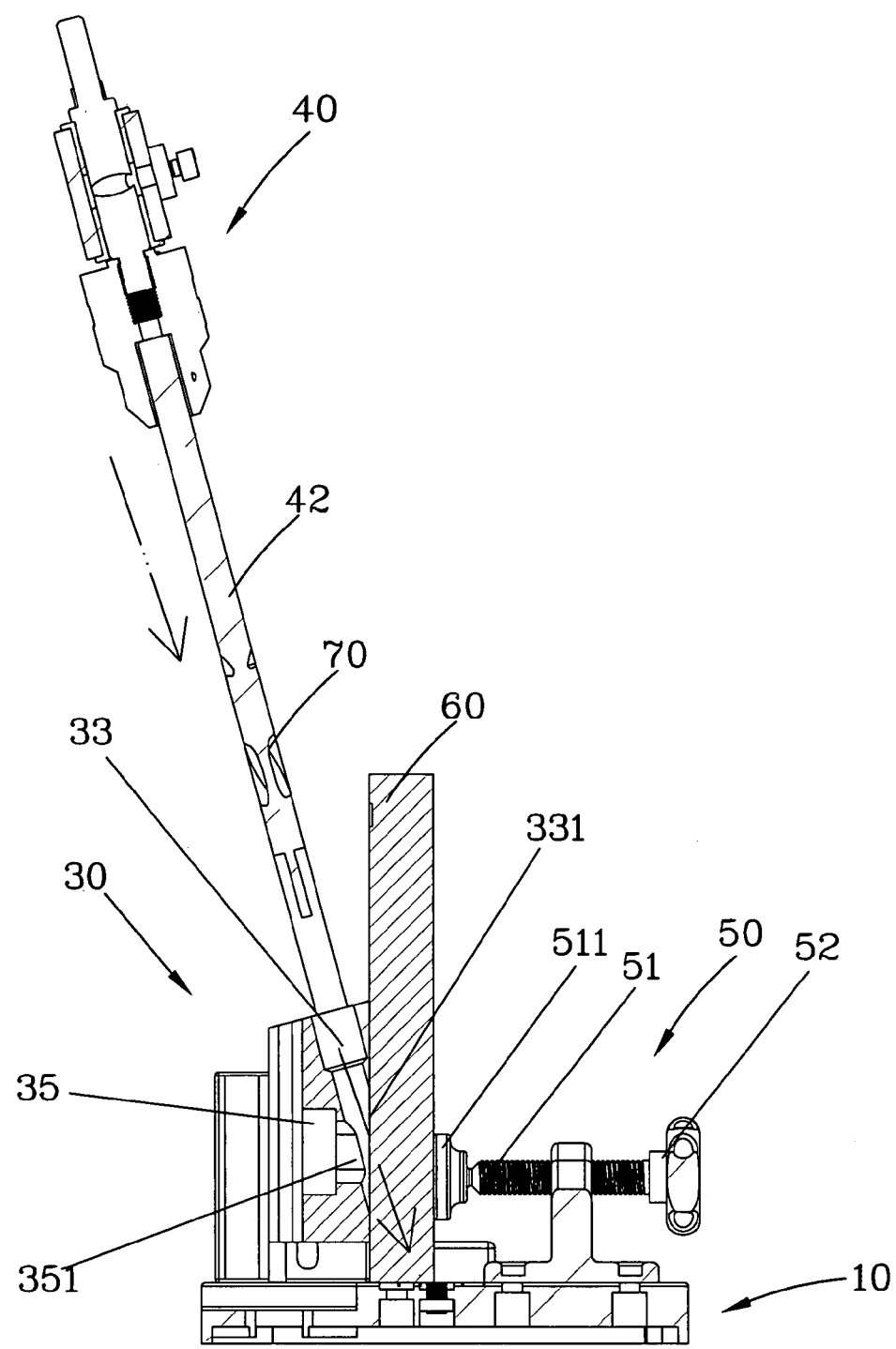
FIG. 5 is a longitudinal cutaway view of a preferred embodiment of the invention.

The sliding saddle 40 is provided with a perforated axle hole 41 each at two parallel sides, which are passed through by two parallel axial bars 42. The bottom of axial bar 42 is securely mounted in the fixating hole 38 situated at the top surface of the drilling jig 30. The axial bars 42 are perpendicular to the inclined plane 32 at the top of the drilling jig 30 (as shown in FIG. 4). A drill chuck 43 is disposed at the center axis of the sliding saddle 40 for holding the drill bit 70, and a driving shaft 44 is disposed at the top of the sliding saddle 40 which is connected to an external power, such as electric drill to drive the drill bit.

Figure 6:
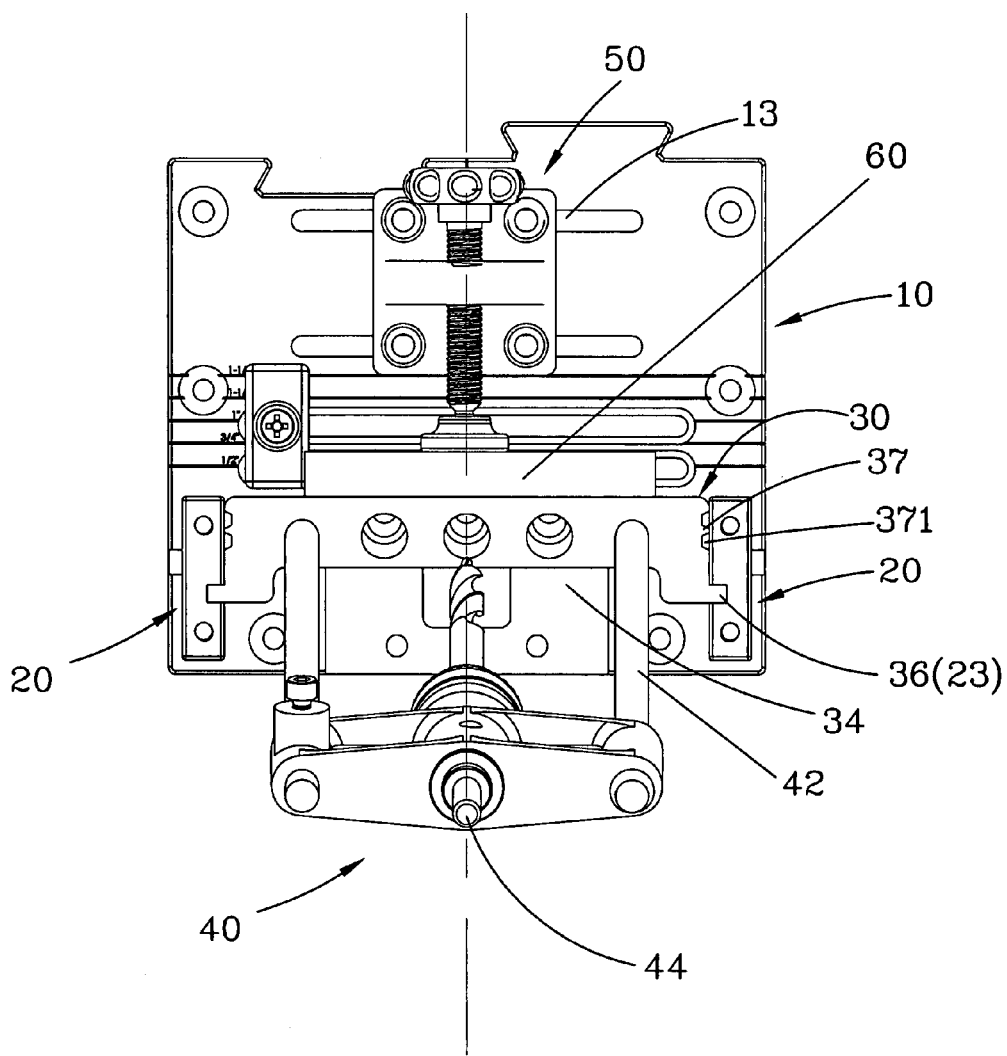
FIG. 6 is a bird's eye view of a preferred embodiment of the invention.
Figure 7:
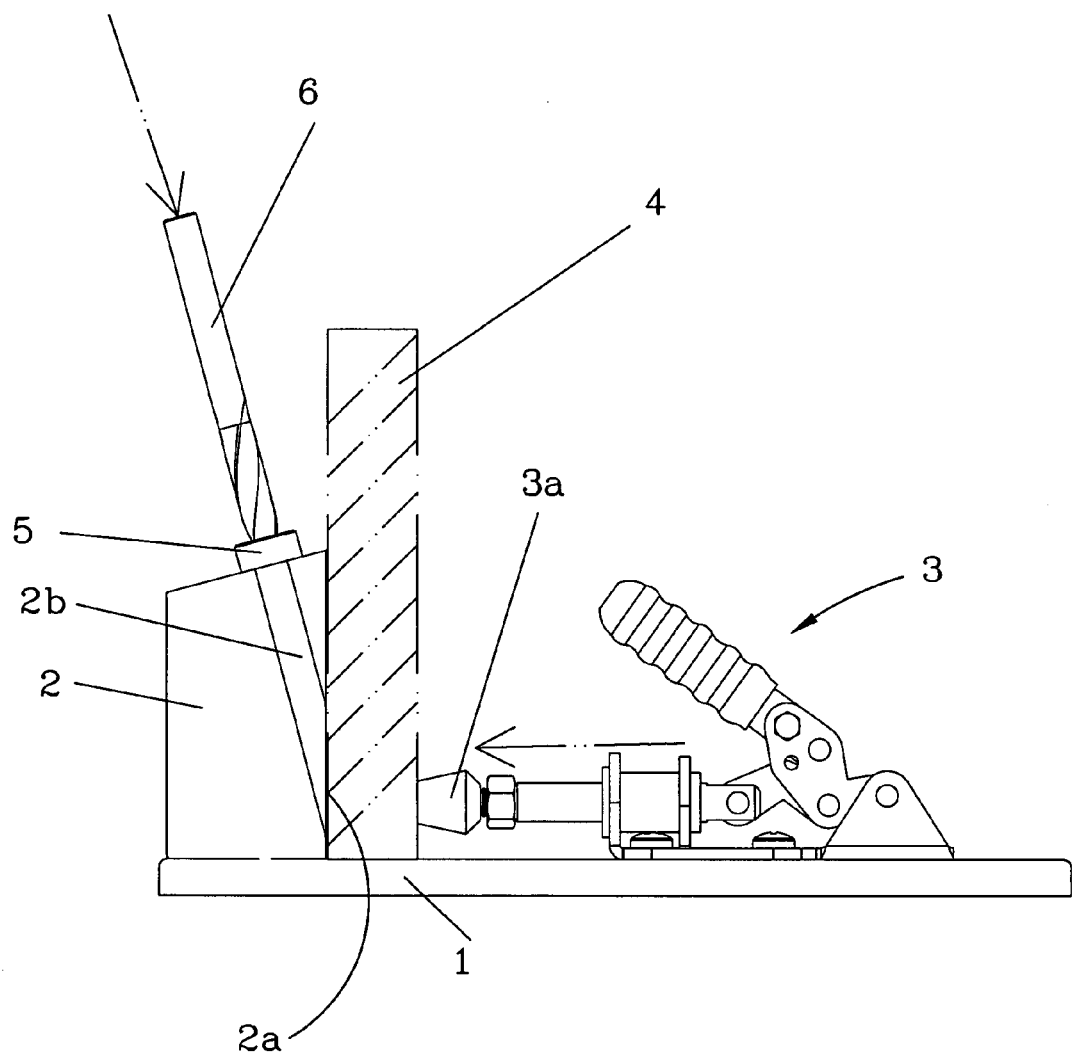
FIG. 7 is a diagram of a conventional upright inclined-hole drilling jig.

The holder 50 as shown in FIGS. 4 and 6 is securely seated in the positioning slots 13 disposed at the axial rear end of the base platform 10. The holder 50 has a pivotally rotating screw arbor 51 and swivel button 52. The screw arbor 51 is disposed with a pressing member 511 at its axial front end to press against and hold the workpiece 60 to be drilled.

The combination of the elements described above constitute an improved upright drilling jig structure of the present invention that can rapidly adjust to position workpieces of varying thickness and guide the drilling of inclined holes. The operation of such drilling jig is described below with reference to FIG. 4 and FIG. 5.

First, push the lower part of workpiece 60 vertically against the clamping end plane 31, and tighten the swivel button 52 to move the pressing member 511 of the screw arbor 51 axially to hold the workpiece 60 in place. Next adjust the top side of the drilling jig to a proper height to align with the center point of inclined hole to be drilled on the workpiece 60. The adjustment is achieved by loosening the bolt holes 372 and mounting bolts 373 that are pressing tight two sides of the drilling jig 30 to free the drilling jig 30 and allow it to slide up or down through the working of the vertical slide tracks 36 on each side engaged by the longitudinal sliding slots 23. As shown in FIG. 4 and FIG. 6, the desired height of drilling jig 36 is positioned by screwing tight the bolt holes 372 and mounting bolts 373 to keep two sides of the drilling jig 30 in place. Finally, move the sliding saddle 40 above the top-side inclined plane 32 of the drilling jig 30 along the two axial bars 42 that will guide the electric drill steadily to drill the inclined hole.

The invention is adjusted through the vertical displacement of the vertical slide tracks 36 on two sides of the drilling jig 30 relative to the longitudinal sliding slots 23 they engage. The design of a plurality of parallel grooves 371 on the retainer shoulders 37 disposed at each side of the drilling jig 30 helps reduce the friction between the opposing sides, thereby facilitating the vertical adjustment of drilling jig 30 to accommodate workpieces of different thickness. The sliding saddle 40 mounted on top of the drilling jig 30 ensures precision drilling of inclined holes without shift by providing steady guidance through the two axial bars 42 perpendicular to the top-side inclined plane 32. The concave constriction design of the bow jumper area 34 at the rear side of drilling jig 30 in particular gives the operator optimum field of vision during the drilling as shown in FIG. 6. The discharge concavity 35 is designed in a manner approaching the clamping end plane 31 to extend transversely in broad-top hole shape to make sure that wood chips are smoothly removed under the spiral traction of drill bit 70 through the chip holes 351 that communicate internally with the guide axle holes 33. In such a manner, the drilling jig can be rapidly adjusted and positioned, and provide precision guide according to the thickness of the workpiece to be drilled, thereby achieving optimum performance.

What is claimed is:

1. An improved upright inclined-hole drilling jig, comprising:

at least a leveled base platform for the mounting of elements;

two parallel panels vertically and securely disposed opposing each other at the axial front-end on each side of the base platform, each parallel panel having a vertical perforated limiting slot hole on the side opposing the other panel and being concavely disposed with a longitudinal sliding slot on the plane adjacent to the limiting slot hole;

an inclined-hole drilling jig slidably disposed between the two parallel panels in a manner enabling its vertical adjustment, and provided with a clamping end plane at its front which being perpendicular to the base platform to provide support for a workpiece; the drilling jig being further provided with an inclined plane having a predefined angle at its top side, the inclined plane being at last concavely disposed with a guide axle hole tilting and perforating the clamping end plane to guide the drill bit; the rear side of the drilling jig being concavely constricted to form a bow jumper area disposed with a discharge concavity in a manner approaching the clamping end plane, the discharge concavity having a chip hole that communicates with the guide axle hole; the ends of the bow jumper area on the right and left side being extended to form a vertical slide track that engages the longitudinal sliding slot and to form a retainer shoulder that adjoins the side surface of the parallel panel;

a sliding saddle slidably mounted on top of the inclined-hole drilling jig through two parallel axial bars, the sliding saddle having a drill chuck being disposed at the center axis of the sliding saddle for holding a drill bit, and a driving shaft at the top which is connected to an external power to drive the drill bit; and a holder being securely mounted on the base platform in axial direction and having a pressing member at its axial front end to press against and hold the workpiece to be drilled;

thereby allowing rapid adjustment and positioning, and providing precision guide to workpieces of varying thickness of the workpiece, and achieving optimum performance of inclined-hole drilling.

2. An improved upright drilling jig according to claim 1, wherein the retainer shoulder of said drilling jig is concavely disposed with a plurality of spaced parallel grooves.

3. An improved upright drilling jig according to claim 1, wherein the axial bars of the sliding saddle are perpendicular to the top-side inclined plane of the inclined-hole drilling jig.

4. An improved upright drilling jig according to claim 1, wherein the discharge concavity of the inclined-hole drilling jig preferably has a transverse hole shape.

5. An improved upright drilling jig according to claim 1, wherein the retainer shoulder is disposed with a bolt hole at its bottom relative to the limiting slot hole of the parallel panel, which allows a mounting bolt to pass through and be stopped by the limiting slot hole.

\* \* \* \* \*